United States Patent [19]
Hess

[11] Patent Number: 5,850,180
[45] Date of Patent: *Dec. 15, 1998

[54] PORTABLE ALARM SYSTEM

[75] Inventor: Brian K. Hess, Westerville, Ohio

[73] Assignee: Tattletale Portable Alarm Systems, Inc., Columbus, Ohio

[ * ] Notice: The term of this patent shall not extend beyond the expiration date of Pat. No. 5,587,701.

[21] Appl. No.: 887,212

[22] Filed: Jul. 2, 1997

Related U.S. Application Data

[63] Continuation-in-part of Ser. No. 717,569, Sep. 23, 1996, Pat. No. 5,777,551, which is a continuation-in-part of Ser. No. 303,950, Sep. 9, 1994, Pat. No. 5,587,701.

[51] Int. Cl.⁶ ................................................. G08B 13/00
[52] U.S. Cl. .......................... 340/541; 340/539; 340/545; 340/693; 379/44; 455/90
[58] Field of Search ..................................... 340/541, 545, 340/546, 539, 636, 693, 691, 326, 331, 506, 825.06, 825.17; 455/90; 320/48; 379/40, 44, 51, 56, 57, 106

[56] References Cited

U.S. PATENT DOCUMENTS

| | | | |
|---|---|---|---|
| 4,222,119 | 9/1980 | Brunner-Schwer | 340/546 X |
| 4,742,336 | 5/1988 | Hall et al. | 340/539 |
| 4,777,474 | 10/1988 | Clayton | 340/539 |
| 4,908,604 | 3/1990 | Jacob | 340/539 |
| 5,019,803 | 5/1991 | Maram | 340/539 |
| 5,117,223 | 5/1992 | Tanner | 340/693 |
| 5,200,735 | 4/1993 | Hines | 340/539 |
| 5,319,698 | 6/1994 | Glidewell et al. | 340/541 X |
| 5,587,701 | 12/1996 | Hess | 340/541 |
| 5,680,112 | 10/1997 | Xydis | 340/539 X |

OTHER PUBLICATIONS

Cellemetry Modem Module (CMM) Data Sheet, Standard Communications Corp, Feb. 1996.

T. Evans, Cellemetry, Network Access Strategy BellSouth Wireless, Inc., date unknown.

*Primary Examiner*—Thomas J. Mullen, Jr.
*Attorney, Agent, or Firm*—Standley & Gilcrest

[57] ABSTRACT

A portable alarm system in which the alarm functions are contained within a portable enclosure, communication is maintained between the alarm system and wireless security devices, and the alarm is capable of initiating a telephone call to a S security monitoring station either by conventional hard-wired telephone lines within a building, by cellular transmission, or by 1900 megahertz PCS. The alarm is capable of initiating a call over the control channel of a cellular phone system. The latch key function allows a child to make his/her parents aware that he/she has arrived home safely.

26 Claims, 11 Drawing Sheets

PORTABLE ALARM SYSTEM

This is a continuation-in-part of application Ser. No. 08/717,569 filed Sep. 23, 1996, now U.S. Pat. No. 5,777,551 which is a continuation-in-part of application Ser. No. 08/303,950 filed Sep. 9, 1994, now issued U.S. Pat. No. 5,587,701.now issued patent 5,587,701.

BACKGROUND AND SUMMARY OF THE INVENTION

The present invention relates generally to alarm systems, and more particularly, to a portable alarm system for use in a residence, boat, office, or any other structure which may benefit from security monitoring.

Alarm systems of various types have been in existence for many years. In known home alarm systems, the components are usually hard-wired throughout a home with the wiring usually terminating at a control panel located somewhere within the home. One of the chief drawbacks of such a system is that the alarm system is permanently installed in the home which offers little or no value to the original purchaser of the alarm system when he or she moves from the home. Furthermore, the installation of such an alarm system is labor intensive and, therefore, costly. The present invention may perform all the functions found in traditional home alarm systems as well as additional new functions. Furthermore, the present invention is easily portable (i.e., able to be carried in one hand by an adult or teenager), externally wireless in one embodiment, capable of placing a call without the need of a hardwired telephone system, and resistant to shock.

The present invention comprises a portable alarm apparatus that incorporates wireless technology along with cellular telephone service technology, for example, to provide a unique and effective deterrent to illegal entry. The preferred embodiment of the present invention is capable of sounding a high-decibel alarm, actuating a strobe light and contacting a security monitor station via cellular or other wireless telephonic transmission technology. The present invention may be equipped to monitor door and window entries and has the ability to sense motion within a room with a preferred motion detector. The present invention may also be equipped with a smoke detector and transmitter for communicating in a wireless manner with the microprocessor of the present invention. The present invention is the only alarm system currently known which offers the following preferred features:

1) is portable;
2) offers wireless connections to doors, windows, smoke detectors, motion detectors, necklace, pendants, etc.;
3) may incorporate cellular, Cellemetry, pcs, or other wireless telephonic technology,
4) is substantially contained in a single, unique, shock-proof enclosure that is small enough to be easily transported from place to place;
5) may be used as a substitute for a traditional hard-wired home alarm system,
6) may be operated from an AC outlet;
7) may be interfaced to a means for making a call over a control channel of a cellular telephone system or by means of 1900 megahertz pcs;
8) may include a latch key function to alert when children arrive home;
9) may include a continuous strobe light that warns of a break-in so the consumer knows not to enter the premises;
10) may include a battery back-up (to assure calls are completed to the monitor station); and
11) may be interfaced to a surveillance camera.

Home alarm systems are frequently connected to the home's telephone wiring system to automatically place a call to a monitor station at some distance away from the home to warn those at the monitor station that a possible illegal entry has occurred. This, in theory, enables those at the monitor station to either send a security officer to the home or place a call to the police to initiate inspection of the home where the alarm was activated. A drawback of this type of system is that sophisticated burglars are knowledgeable of such systems and will cut the telephone wires prior to entry into the home, thereby rendering the security monitor station useless (because when the illegal entry occurs, the system will not function to place the automatic call to the security monitor station). The present invention solves this problem by providing cellular phone transmission. Additionally, the cellular communication means is enclosed within the alarm system enclosure and is adapted to run off the power supplied by an AC outlet or a backup power source within the enclosure.

Thus, the present invention makes a significant contribution to the art by being the first wireless, wireless alarm system made portable. The first "wireless" is in reference to the fact that the present invention does not require wires to be operational. The second "wireless" is in reference to the fact that the invention may be cellular or other wireless communication. The integration of these two "wireless" features into a small, easily portable, enclosure is unique and provides a very beneficial product to consumers.

The present day security alarm system market offers few alternatives for the millions of citizens that live in apartments (where they are unlikely to spend significant amounts of money to install a permanent, hard-wired, alarm system when they may not be living in the apartment for more than a relatively short amount of time), a hotel room, a leased office space, short term warehousing, motor homes, construction trailers, and a multitude of other environments in which a person would not intend to stay for a relatively long period of time and thus would not wish to invest a significant expense in a permanent alarm system. It is exactly these environments where crime is often the highest. Therefore, a need exists for an alarm system that is portable, which is relatively inexpensive, which is easy to use, and which does not have to rely on a building's installed telephone lines or power lines.

The present invention comprises a portable enclosure; a microprocessor installed within the enclosure; a wireless receiver installed within the enclosure and electrically connected to the microprocessor for receiving alarm signals from intruder sensing devices; a communications means, in electric communication with the microprocessor, for initiating a telephone call to a location away from the place in which the alarm system is located; an interface keypad panel in electric communication with the microprocessor for programming the alarm system according to specific user needs.

It is also preferred that the portable alarm system be comprised of a shockproof construction comprising reinforced ribbing in an injection molded plastic enclosure. In this respect, if a burglar attempts to defeat the invention by crushing it, the present invention will withstand physical shocks.

It is also preferred that the alarm system of the present invention be further comprised of: a motion sensor electrically connected to the microprocessor for detecting intrusion into the protected area; an LED board electrically connected to the microprocessor for indicating the current status of the alarm system; an audio siren electrically connected to the microprocessor; a strobe light electrically connected to the microprocessor; a back-up power source or battery electrically connected to the microprocessor for providing back-up power to the microprocessor; a surveillance camera electrically connected to the microprocessor and secured within the enclosure for visually monitoring the premises and transmitting a picture or series of pictures to a monitor station.

It is also preferred that the portable alarm of the present invention be adaptable to initiate a call over a control channel of a cellular phone system or 1900 Mhz pcs. A data interface converts an alarm signal to a radio signal which may be transmitted via a cellular modem, or Cellemetry, PCS, or other airwave means.

DETAILED DESCRIPTION OF THE PREFERRED EMBODIMENT (S)

Figure 1:
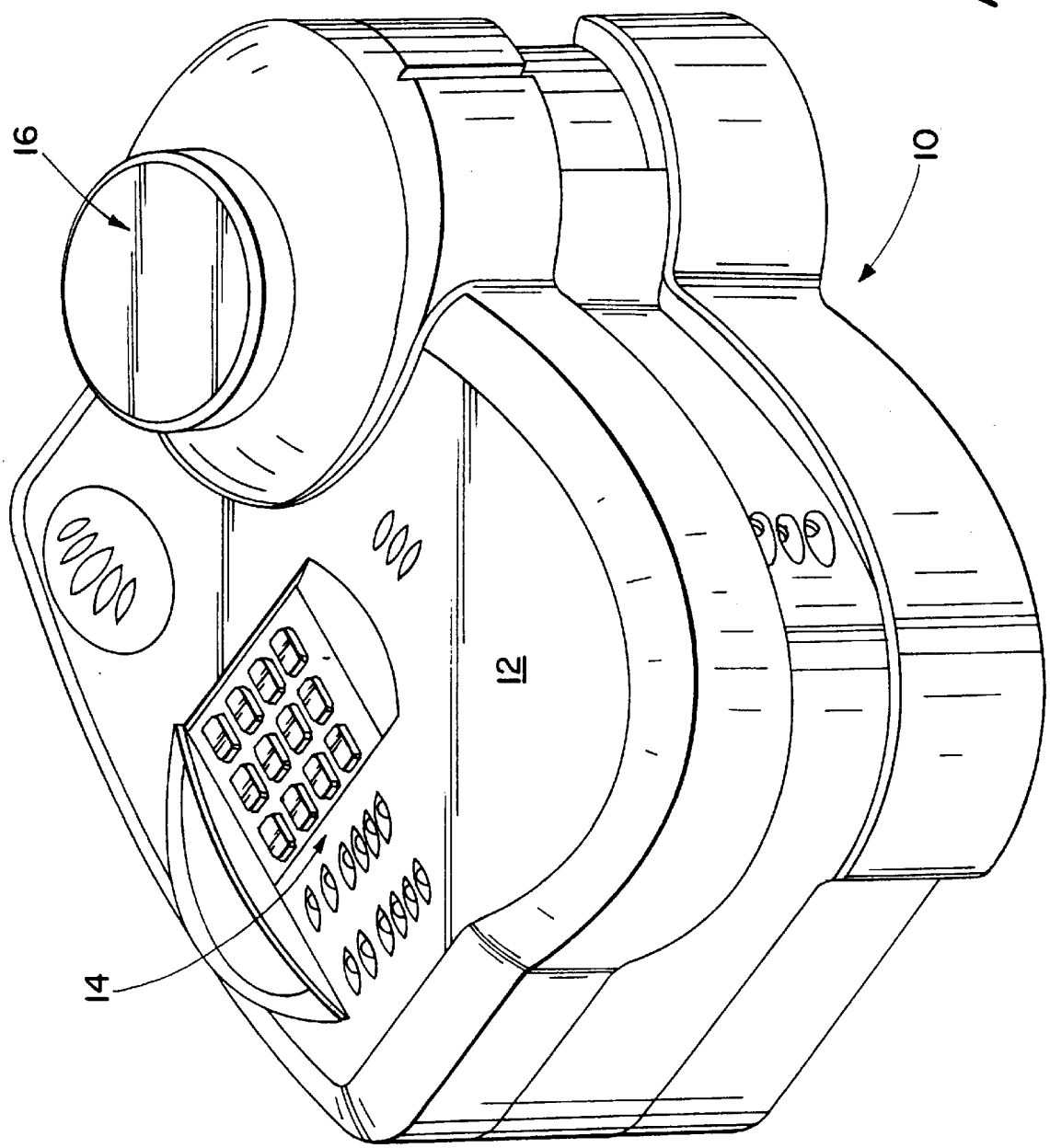
FIG. 1 is a perspective view of one embodiment of the present invention.

Novel features and advantages of the present invention, in addition to those mentioned above, will become apparent to those skilled in the art from a reading of the following detailed description in conjunction with the accompanying drawings, wherein similar reference characters refer to similar parts and in which:

FIG. 1 is a perspective view of one embodiment of the present invention. The portable alarm system 10 is contained in a portable enclosure 12. A keypad, i.e. an interface keypad panel 14, interfaced with the microprocessor 20, can be used to program the alarm system 10 according to specific user needs. A strobe light 16 is preferably contained in the enclosure 12.

Figure 2:
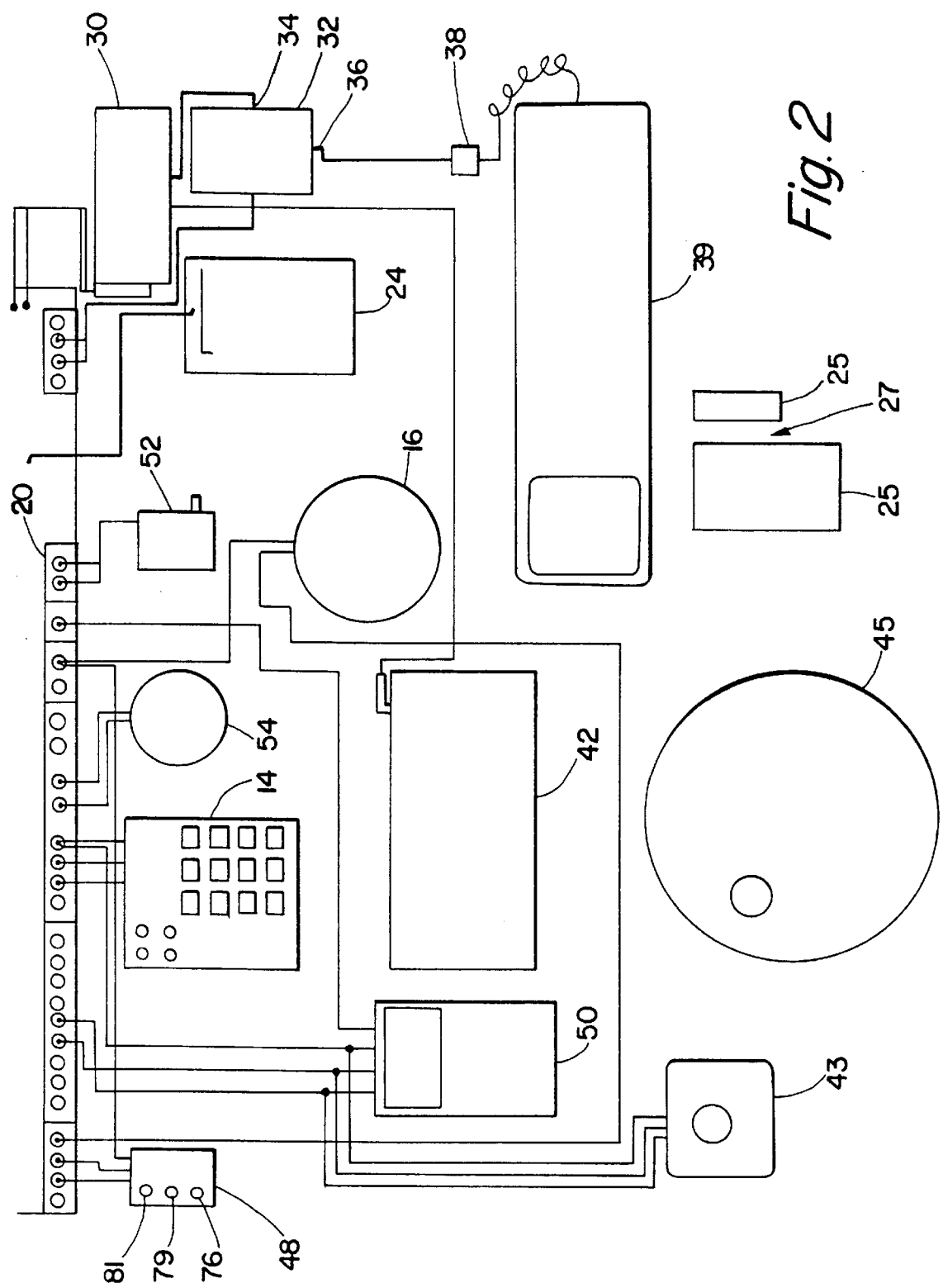
FIG. 2 is a schematic of the present invention interfaced with cellular functionality.

FIG. 2 is a schematic of the present invention interfaced with cellular functionality. In the preferred embodiment, the alarm of the present invention is comprised of:

a keypad panel 14;

a strobe light 16;

a microprocessor control board 20;

a receiver board 24;

a data interface 32;

a cellular transceiver 30 and handset 39;

a battery 42;

a wireless smoke detector 45;

an LED board 48;

a motion sensor 50; and a transformer 52.

Wireless security contact switches 25, or other deviation sensing devices, are placed on doors, windows, etc. of the residence to be secured. If a door or window is opened while the alarm 10 is set, the alarm 10 will be activated. The breaking of the switch connection 27 at the security contacts 25, at the point of entry, causes a signal to be received at the wireless receiver 24. Once the intruder signal has been received by the receiver 24, the microprocessor 20 will send appropriate signals which activate the audio siren 54, the strobe light 16, and the cellular phone, etc., which places a call to a security monitor station.

FIG. 2 depicts the elements of the alarm system 10 that may be contained in the portable enclosure 12. The alarm system 10 is controlled by the microprocessor 20. The microprocessor 20 is a microcomputer based control panel. In one embodiment, the alarm microprocessor 20 is a commercially available microprocessor alarm board that may be supplied by any of a number of alarm board suppliers in the alarm industry. In the preferred embodiment, the microprocessor 20 is connected to a power transformer 52 to provide current to the microprocessor 20 from a source such as a conventional wall outlet. The microprocessor 20 processes the data received at its various inputs and sends appropriate signals to the other components of the alarm system 10, according to the received inputs discussed in further detail below.

The keypad panel 14, is electrically connected to the microprocessor 20. The keypad panel 14 is used to program the alarm system 10 according to specific user needs. In the preferred embodiment, the keypad panel 14 is capable of multiple user codes which may be inputted to arm/disarm the alarm system 10. Additionally, the keypad panel 14 may be used to activate a Panic/Ambush feature which allows the user to activate the alarm sequence (e.g. activate the siren 54, strobe light 16, and call) by the push of one or two buttons. This feature may be remote from the keypad panel 14, such as by a remote panic button worn on a necklace.

The keypad panel 14 may also be used to send a silent distress signal by actuating predetermined code numbers on the keypad panel 14. The keypad panel 14 also allows the user to program, and configure, the alarm system 10 based on individual user needs. For example, the user may program the alarm system 10 to monitor or bypass all or specific intruder zones, discussed in more detail below, or program specific call parameters.

The AC inputs of the microprocessor 20 are wired to a transformer 52 that may be connected to an AC outlet. The interface keypad panel 14 is wired to the clock, data, and communications inputs of the microprocessor 20.

As discussed, the wireless receiver 24 is installed within the enclosure 12 and electrically connected to the microprocessor 20. The receiver 24 receives alarm signals from wireless devices which may be placed at doors, windows, or any other aperture to be monitored. These intruder sensing devices are comprised of transmitters which send signals (such as report zone status and supervision information) to the wireless receiver 24.

A communications means capable of initiating a telephone call to a location away from the place in which the alarm system 10 is located, such as a security monitoring station, is also preferably contained in the enclosure. In one embodiment, the telephone connection is through a standard telephone jack located on the premises being secured. In another (preferred) embodiment, the communication means is a cellular phone. The cellular phone is a radio transmitter and receiver. When the phone is on, an externally mounted antenna is the part of the phone that sends out and receives radio frequency energy. In the preferred embodiment, the phone operates in the frequency range of 824 mhz to 894 mhz and employs commonly used frequency modulation techniques. Additionally, the phone may transmit at a power level that can range from 0.005 to 3 watts. When instructed by the microprocessor 20, the phone will place a call to the monitor station (e.g. when an alarm has been detected). A call may also transmit data to inform of a low battery condition in the alarm system 10. The phone may also be used as another means of ordinary non-emergency communication (e.g. as a regular cellular phone).

When cellular technology is incorporated, a cellular data interface unit 32 is electrically connected to the transceiver 30 to formulate a "tip and ring," which is commonly associated with a dial tone on standard telephone systems. The tip and ring is initiated by the cellular transceiver 30 and a call goes out to a cell site. From the cell site, a signal is sent to a mobile telephone switching office (MTSO). From the MTSO, the call is typically forwarded to the land line telephone company and from there to its final destination (e.g. - the security monitor station or 911 office). The cellular data interface unit 32 is preferably connected to the cellular transceiver 30 out of the RJ45 jack on the side of the cellular data interface unit 32 at 34. The RJ45 jack, at 36, connects to the RJ45 receptacle 38 on the back of the alarm 10. A cellular handset 39 may be plugged into this receptacle 38, allowing the alarm system 10 to be used as a regular cellular telephone. This is advantageous since the alarm system 10 may be used to make telephone calls independent of the functioning of the alarm system 10. By plugging a cellular handset 39 into the alarm 10, specifically in the receptacle at 38, any type of phone call may be made, social or business, via the alarm system 10. Thus, if the alarm system 10 is taken to secure a vacation cabin home for a weekend in the mountains, the alarm system 10 may also be used with a cellular handset 39 to make desired phone calls.

A battery 42 acts as a back-up power supply to the transformer 52. It may be recharged by receiving a trickle charge from the transformer 52.

The motion sensor 50 is preferably a combination passive infrared sensor (PIR) and microwave sensor; both contained in a single device. The motion sensor 50 will send an activation signal to the microprocessor 20 when both infrared and microwave sensors detect intrusion at the same time. The PIR operates by detecting a rapid change in temperature when an intruder crosses a protected area. When a beam emanating from the sensor 50 experiences a change in heat (projected back through a lens in the sensor) a pulse is generated by the sensor element. The microwave transmitter sends out a short burst of radio frequency energy and the receiver detects changes in the returned signal caused by motion within the covered area.

The motion sensor 50 is preferably wired to appropriate input locations, i.e. communications terminals, on the microprocessor 20. The microprocessor 20 is programmed to recognize the input signals from the motion sensor 50 and to activate the subsequent alarm signals. Motion sensors 50 may be purchased from a variety of manufacturers. A preferred range for the motion detector would be sufficient to adequately cover the area of a large room, preferably out to a 45 foot range, at 90 degrees, from the location of the motion sensor 50.

The invention may also include a miniature surveillance camera 43. One such camera 43 is available from TVX, Inc., model TVX-01, in Broomfield, Co. The camera 43 is electrically connected to the microprocessor 20.

When the alarm system 10 is armed, a violation of the protected area will send a message to the microprocessor 20. Upon receiving a signal indicating a violation has occurred, the microprocessor 20 will activate the siren 54 and the strobe light 16 along with placing the call to the monitoring station. The audio siren 54 and strobe light 16 are used as audible and visual deterrents. The strobe light 16 flashes a bright light, preferably at a rate of 60 to 100 pulses per minute, for example.

Preferably, the strobe light 16 remains flashing after the alarm system 10 has reset. The user/owner of the alarm 10 may be required to turn off the strobe 16. In this way, the strobe 16 may be programmed to stay on to warn the user/owner upon returning to the residence that a break-in has occurred. The strobe 16 remains flashing after a break-in with either the AC power source 52 or battery 42 back-up supplying power to the strobe 16. The siren 54 preferably produces a loud warble tone at 82 to 115 dBa at a frequency of 2900±500 Hz, for example. The audio siren 54 is preferably flush-mounted to a surface of the enclosure body 64. The strobe light 16 and siren 54 are both wired to appropriate output terminals on the alarm control panel 20 which provide sufficient signals to drive the devices.

The wireless smoke detector 45 communicates to receiver 24. The detector 45 is adapted to actuate receiver 24 to contact the monitoring station which complies with commercial fire code standards. The camera lens 43 is connected to the microprocessor board 20.

The interface keypad panel 14 may also be used to activate/deactivate the audio siren 54, to program the telephone number of a security monitor station into the alarm system 10, and to enter a user code that would enable the owner of the alarm system 10 to activate/deactivate the device during a predetermined time upon exit/entry into and out of the alarm 10 owner's residence.

The alarm system 10 may be programmed through the keypad panel 14 to interact with different intruder zones within a secured residence. For example, zone 1 may be the front door of a residence. Zones 2, 3, and 4 may be specific windows of the residence. The alarm system 10 may be programmed to have a delay of 30 seconds at zone 1, and no delay at zones 2–4. With no delay, the alarm system 10 would be instantly activated once an illegal entry has been made.

The LED board 48 is preferably used to display different types of status signals, based on the status of the system 10. The first status LED 81, preferably, emits a steady red light when AC power is present or a flashing red light when the battery is low. The power indicator 81 provides information on the status of the power sources available to the alarm system 10. The power indicator 81 will turn off when complete power to the system 10 is absent.

The second status LED 79, preferably, emits a red light when the alarm system 10 has been armed or a flashing red light when the instant arming feature has been activated (instant arming means that a trip signal from any of the zones will cause an alarm instantly without any delay time).

Figure 3:
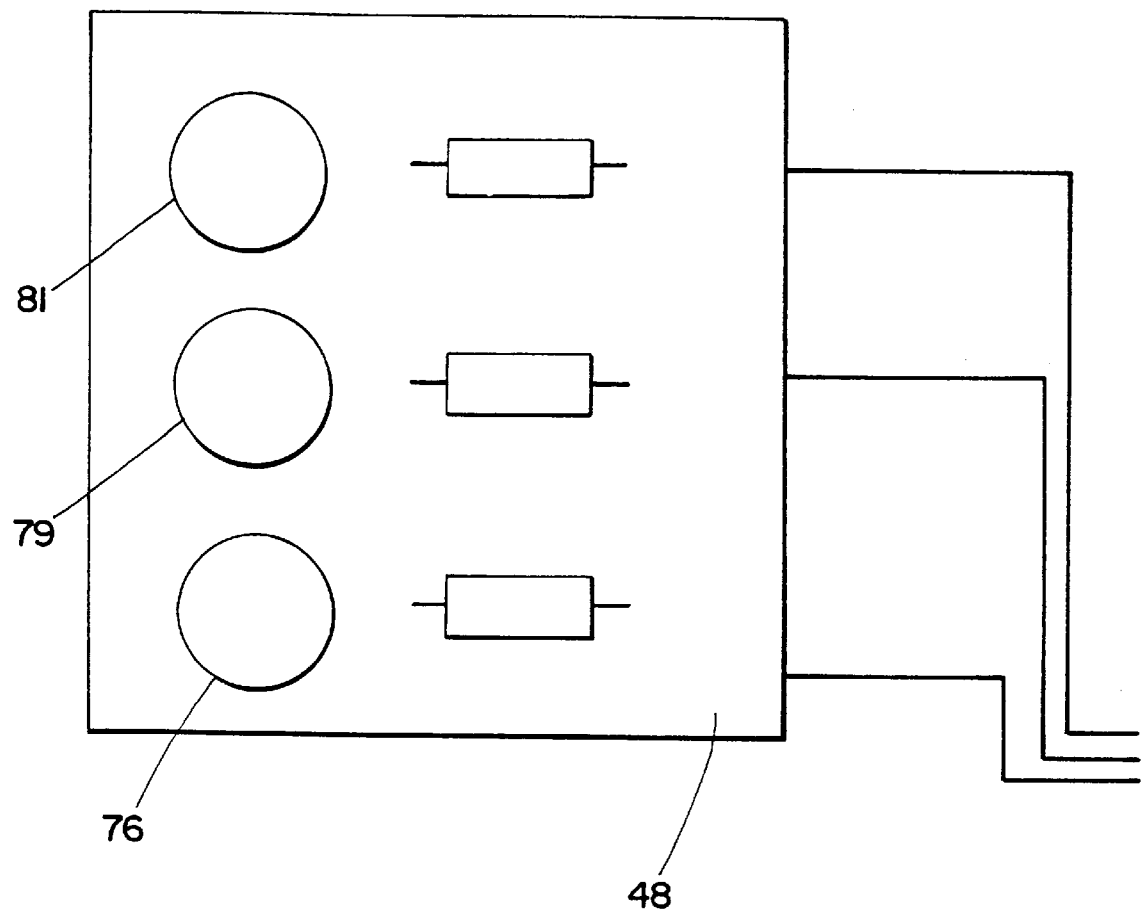
FIG. 3 is a circuit schematic of an LED board.

The third status LED 76, preferably, emits a steady green light to indicate that a call is being transmitted to a monitoring station. (FIG. 3 is a schematic of one embodiment of the LED board 48.) The LED board 48 is preferably wired to auxiliary output terminals of the microprocessor 20.

The alarm system 10 also, preferably, has a service light indicator 78. The service indicator light 78 provides information on the availability of cellular service to the system 10. The alarm system 10 may also be configured with zone indicator lights 82. The zone indicator lights 82 will flash when a particular zone is faulted or breached. Additionally, the zone indicator lights 82 will flash rapidly when a transmitter, associated with the light 82, is low on battery power or is malfunctioning.

The alarm system 10 may also be configured with a ready light 80. Preferably, the ready light 80 emits a green steady light when the system 10 is ready to be activated (i.e. armed). A flashing light indicates that the user may arm the system 10, but that the user is currently in front of the motion sensor 50.

Figure 5:
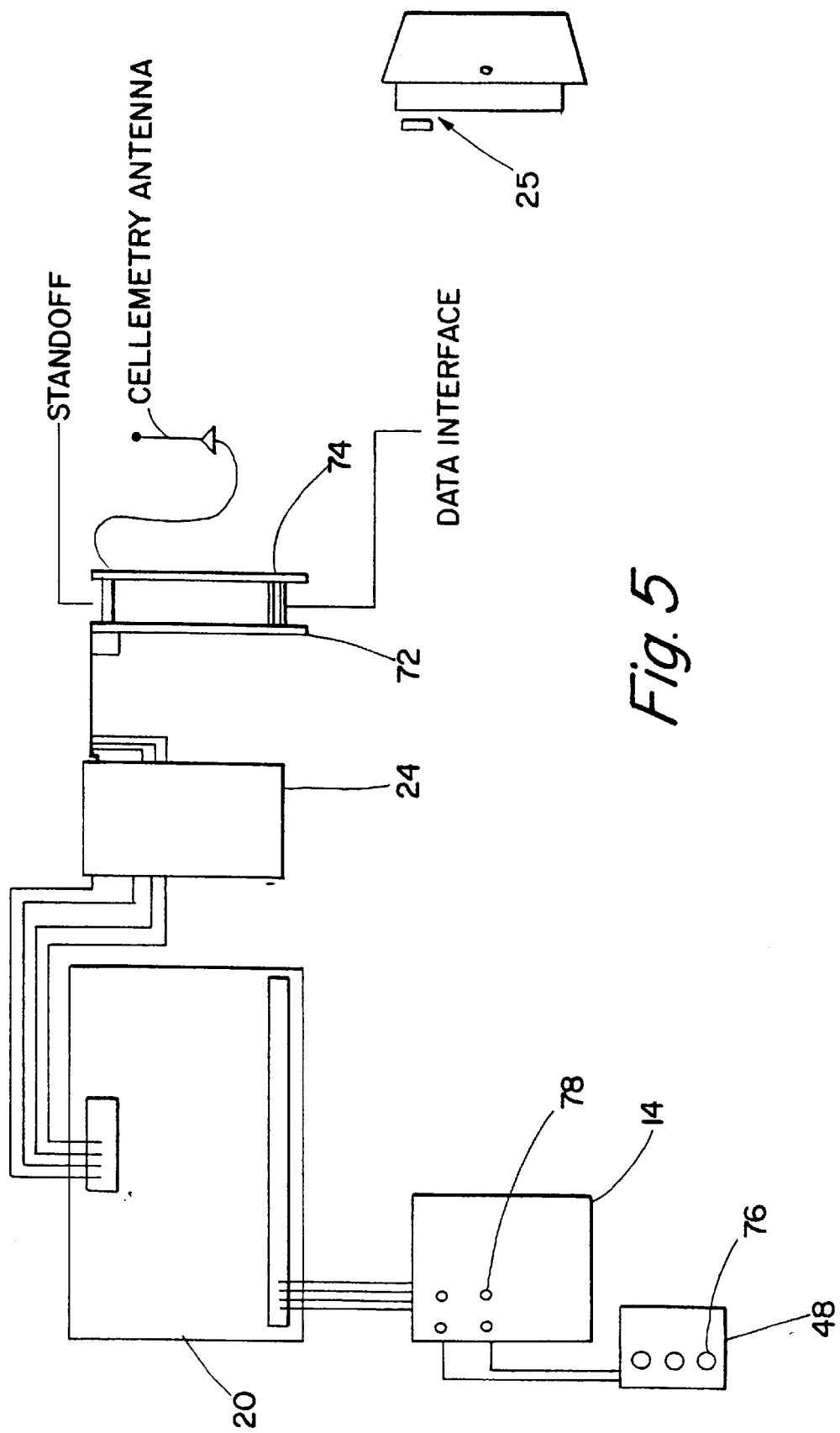
FIG. 5 is a schematic of the present invention interfaced with Cellemetry functionality.

FIG. 5 illustrates another embodiment of the present invention. FIG. 5 illustrates a schematic of a portable alarm system 10 that uses Cellemetry technology for converting alarm protocol into cellular data signals.

Cellemetry represents the marriage of cellular telephone service and telemetry. It provides a relatively inexpensive and reliable method of transmitting and receiving packets of critical information (or data), employing existing, yet underutilized, radio channels. To enable such technologies an MTSO (mobile telephone switching office) serves as a gateway to the Cellemetry system.

Every cellular phone system has voice channels for traditional communication and control channels which handle the administrative overhead of the cellular system, such as collecting customer calling information. Due to cellular technologies, the control channel is utilized only a small fraction of the time (10% usage) leaving it available for other tasks - provided that these other tasks d o not interfere with the primary functions (or regular cellular activity, non-Cellemetry) of that channel however, a control channel is rarely ever occupied for more than a few seconds due to primary function allocations).

Cellemetry technology, in essence, mimics a "roaming" mobile telephone. During a roaming setup sequence, a registration process takes place in which the cellular system verifies that the unit attempting to make the calls is valid. Each cellular system sends a message at regular intervals to all of the "roamers" operating in its system, telling them how to operate as a roamer. One of the requirements as a roamer is to autonomously register (AR), during which time the cellular telephone reports its mobile identification number (MIN) and electric serial number (ESN) to the cellular system via the Reverse Control Channel. The cellular system processes these signals and routes them, via a special network, back to the cellular customer's home cellular system which validates the customer's identity and provides all of the customer's calling features. The MINs are specially assigned so that the Cellemetry calls are routed only to the Cellemetry gateway. These signals may be used by the portable alarm system 10 of the present invention to alert a monitor station of intruder entry, etc.

The Cellemetry gateway at the central station processes the messages and passes them on to be processed according to the caller's unique features.

As discussed, FIG. 5 illustrates a schematic of one embodiment of the portable alarm system 10 of the present invention which utilizes Cellemetry technology. A wireless security contact 25 sends an intruder signal once a zone being monitored is breached. A wireless receiver 24 receives the intruder signal and takes appropriate action as discussed above, e.g. activating the alarm 10. The wireless receiver 24 transmits alarm protocol to the Cellemetry interface 72 which converts the alarm protocol into cellular data. In another embodiment, the processor 20 may develop the protocol for the alarm signal which is sent to the Cellemetry interface 72. Accordingly, the interface 72 acts to convert signals, which indicate a zone has been actuated, to a radio signal for transmission over the control channel of the cellular phone system.

The Cellemetry Modem Module 74 transmits and receives cellular data as it is commanded by the interface 72. The Cellemetry Modem Module 74 sends the signals, as discussed above, which the Cellemetry system processes and routes. Accordingly, alarm signals from particular portable alarm systems may be sent via the control channel and identified and processed for appropriate action.

In the embodiment shown in FIG. 5, the calling light 76 is connected so as to emit when a call is being transmitted to the monitoring center. These LEDs 48 are actuated by the control signals of the particular processor 20 used to control the alarm system 10 of the present invention. Similarly, a service light 78 may be connected to the keypad panel 14, controlled by the particular processor 20, for indicating when the cellular service is, or is not, available.

Figure 6:
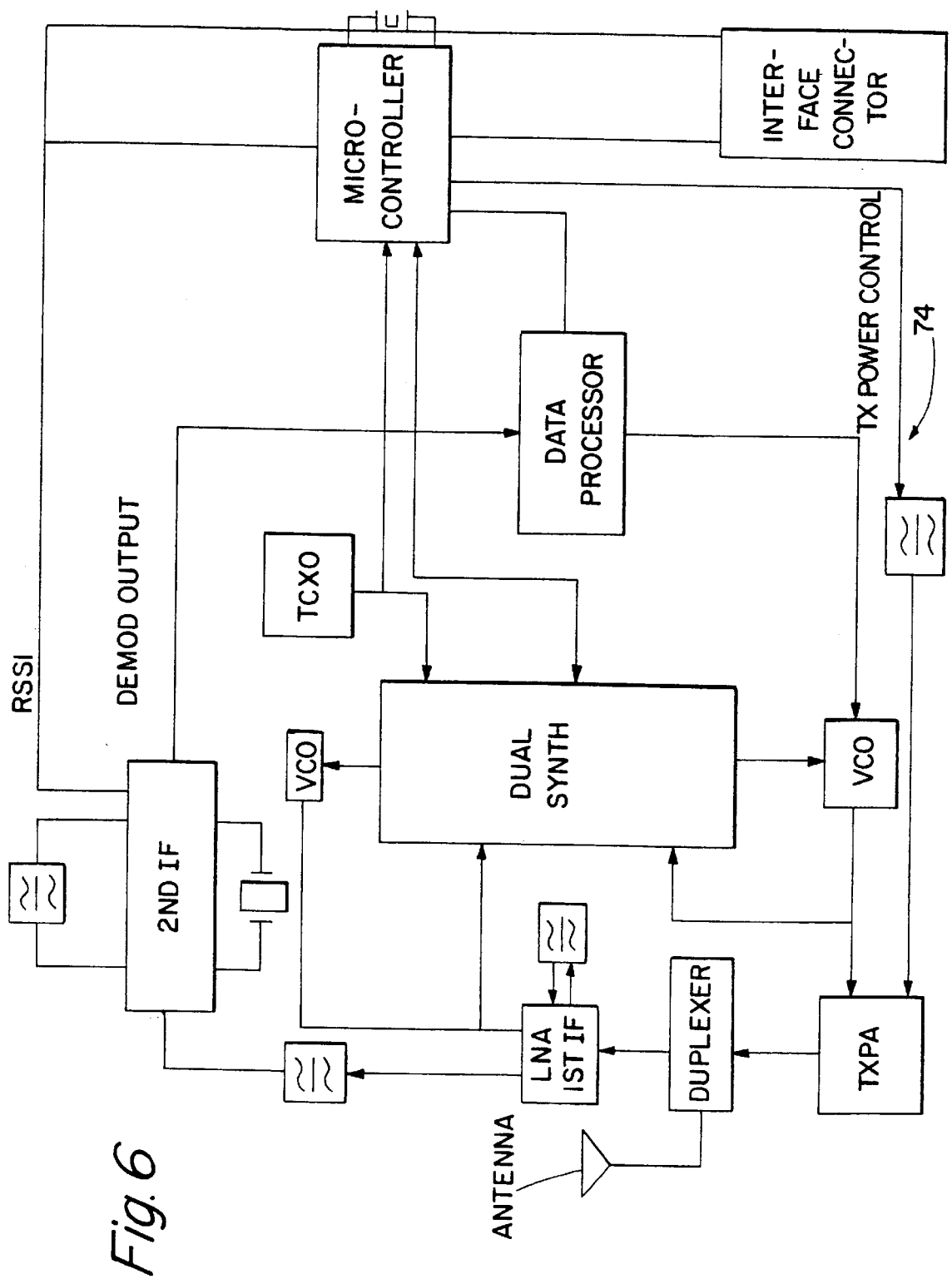
FIG. 6 is a circuit schematic of one example of a Cellemetry Modem Module.

The Cellemetry Modem Module 74 may be an off-the-shelf product. For example, Standard Communications produces a Cellemetry Modem Module (CMM) 74 which can be interfaced to the portable alarm system 10 of the present invention to provide enhanced and flexible portable alarm monitoring features. The Cellemetry Modem Module 74 should support the subscriber unit radio transceiver requirements for the Cellemetry system. FIG. 6 illustrates one embodiment of a Cellemetry Modem Module 74.

Figure 7:
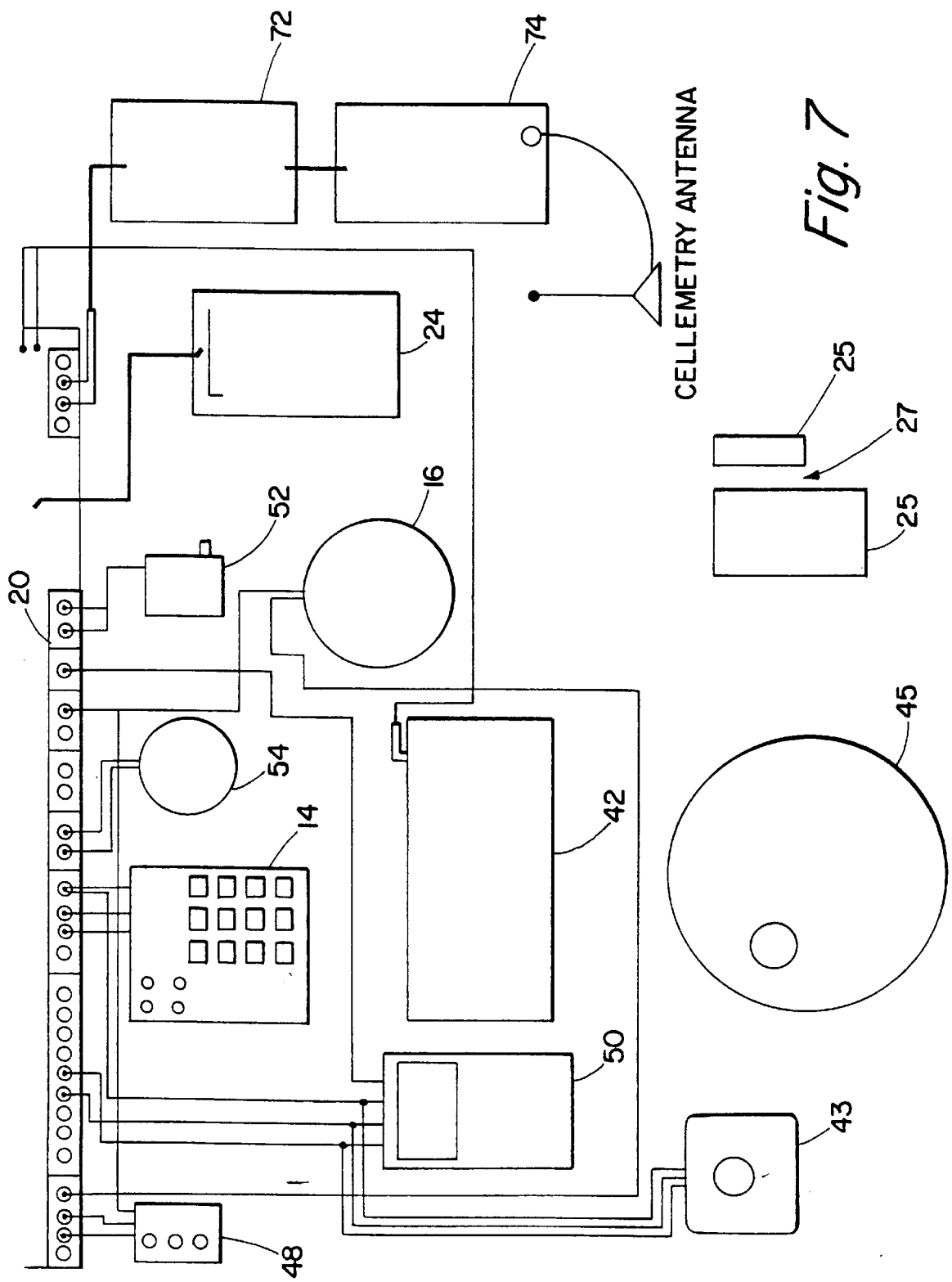
FIG. 7 is another example of a schematic of the present invention interfaced with Cellemetry functionality.

FIG. 7 illustrates another embodiment of the portable alarm system 10 of the present invention. The system 10 is preferably comprised of a microprocessor board 20, an LED board 48, a keypad panel 14, a battery 42, a strobe light 16, a wireless receiver 24, a siren 54, a motion sensor 50, an interface board 72, and a Cellemetry Modem Module 74. The cellular communication means may be actuated to place a primary function phone call via the cellular voice channels when the control channel is in use, for example. A digital circuit which monitors the busy idle bit of the cellular data stream, for example, may determine the control channel is being used by its regular cellular customers (e.g. busy) which then turns to actuate the cellular communication means which actuates a primary function call to the remote security station.

Accordingly, the cellular call will be made to the remote station regardless of heavy activity on the control channel. The cellular communication means may also be used in a conventional manner, e.g. voice channel for phone calls, as discussed previously.

Utilizing the Cellemetry Modem Module 74 allows significant cost savings for the user of the portable alarm system 10. With Cellemetry, calls are calculated by the number of messages sent and not by the typical cellular monthly charge (that would be incurred regardless of whether the system was used or not). Accordingly, the owner of the portable alarm system 10 would only incur costs for each time the unit makes a phone call; as opposed to incurring expensive monthly charges for traditional cellular service. Additionally, since Cellemetry utilizes radio waves and digital data control channels, service is reliable and offers advantageous spectral efficiency. Additionally, radio interference is further decreased since the control channels are reused at greater distances as compared to voice channels. This feature also allows for increased mobility of the portable alarm system 10.

Figure 8:
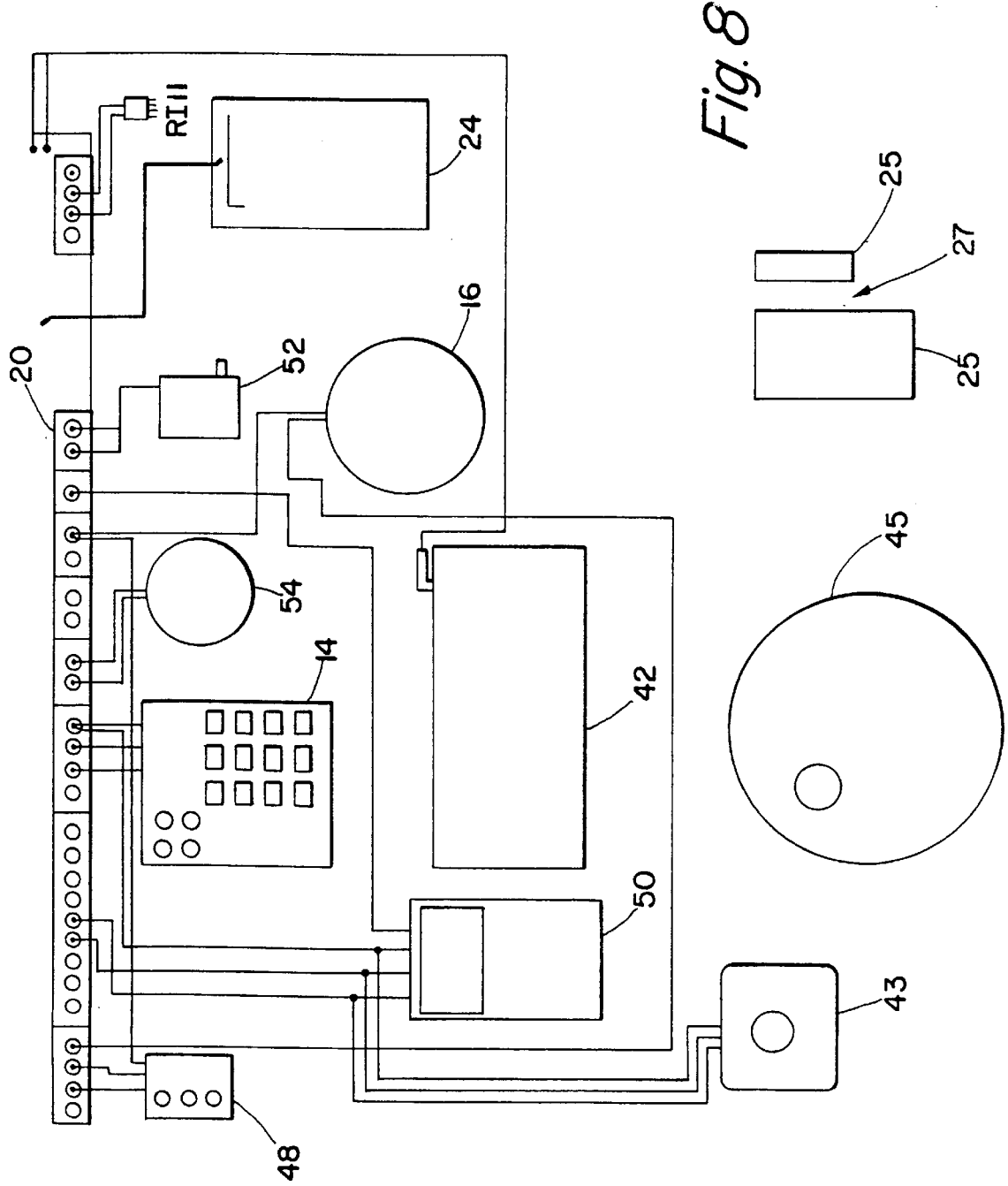
FIG. 8 is a schematic of one example of a landline module.

FIG. 8 illustrates an example of a dial tone embodiment of the present invention. As illustrated, the phone outputs of the microprocessor 20 are connected to a RJ11 jack.

Figure 9:
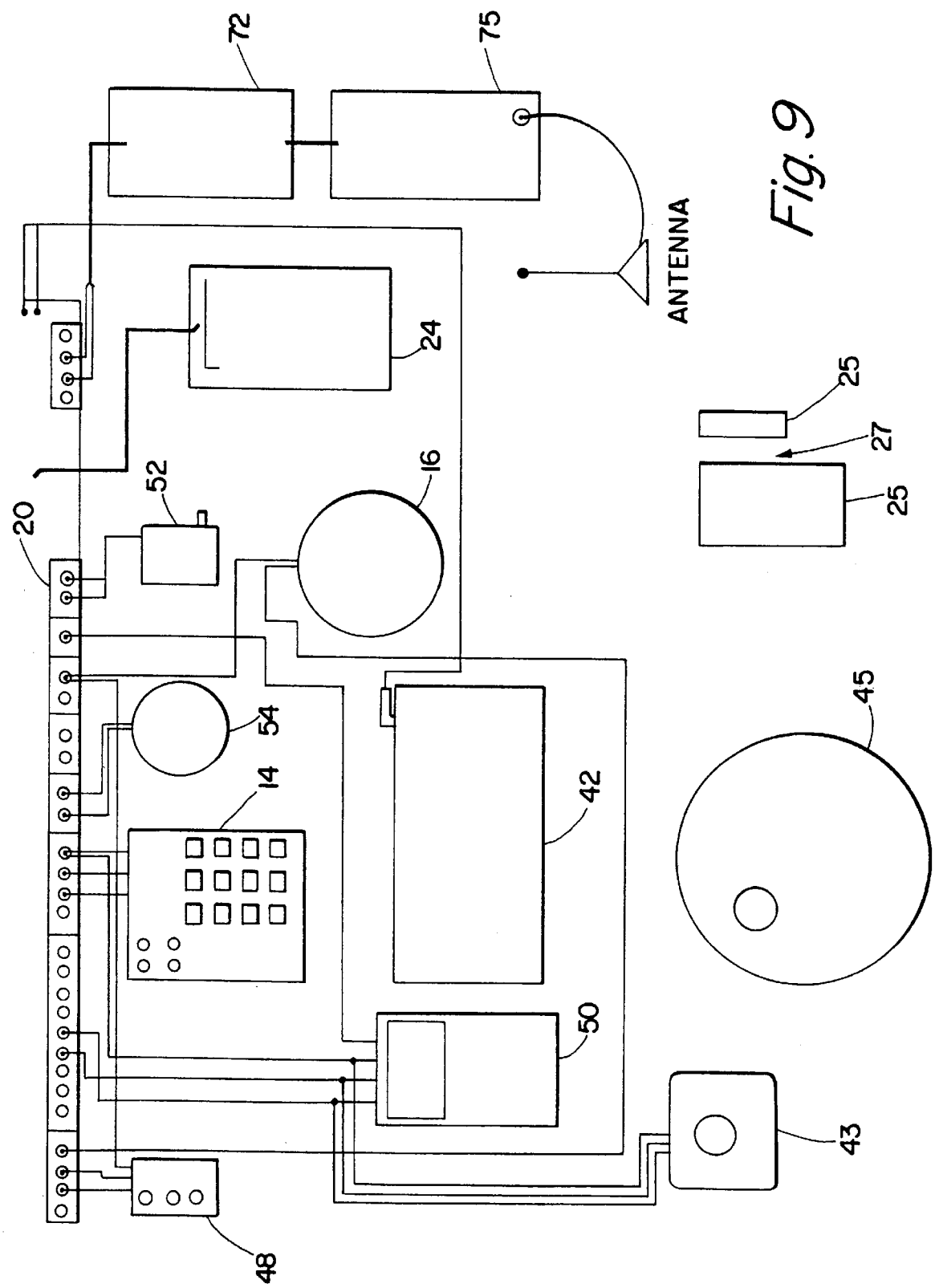
FIG. 9 is a schematic of one example of a PCS application.

FIG. 9 illustrates one embodiment of a PCS unit of the present invention. The electrical schematic shown in FIG. 9 is substantially similar to FIG. 7 with the exception of a PCS modem module 75.

Figure 10:
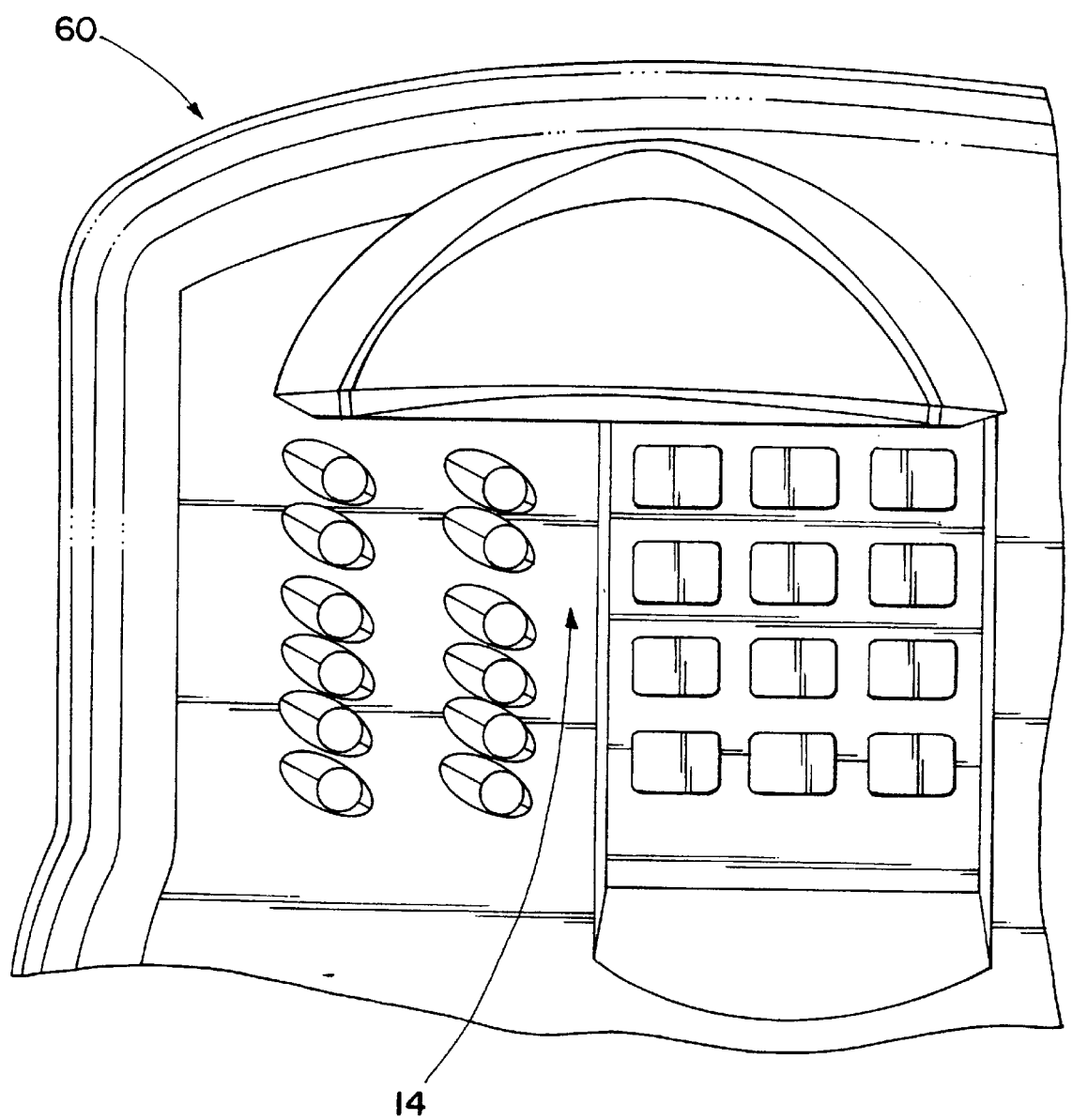
FIGS. 10–12 illustrate a preferred embodiment of the top view of the present invention with a view of a service light configuration.
Figure 11:
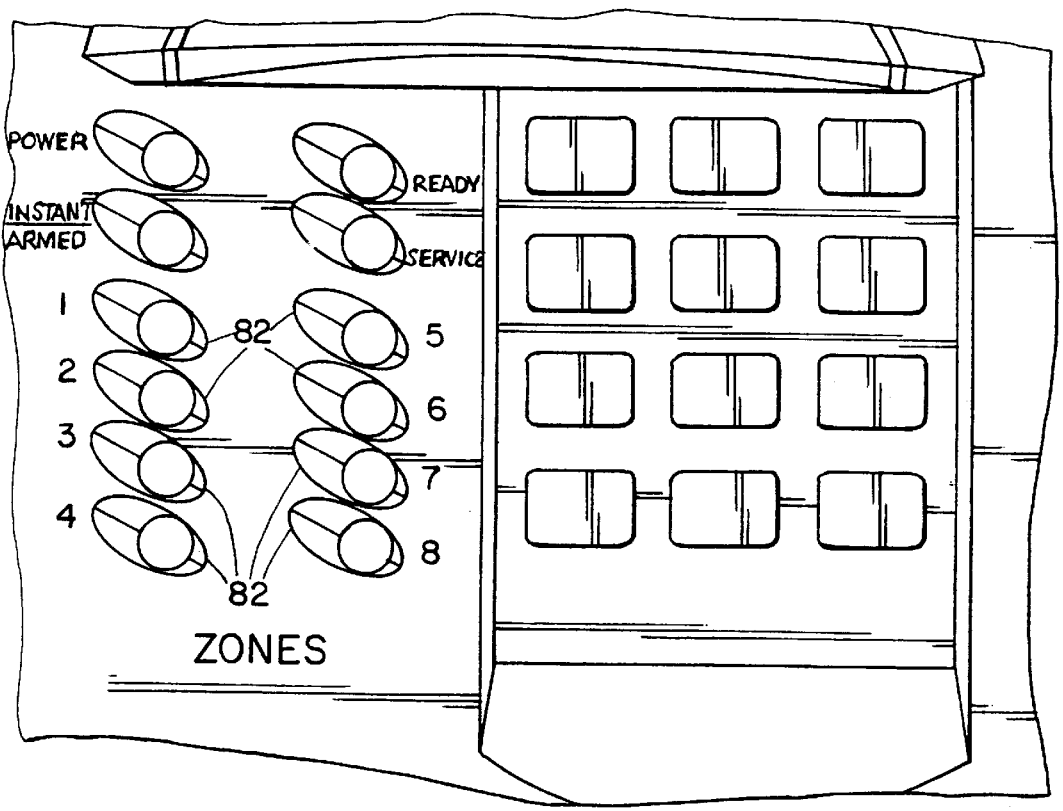
Figure 12:
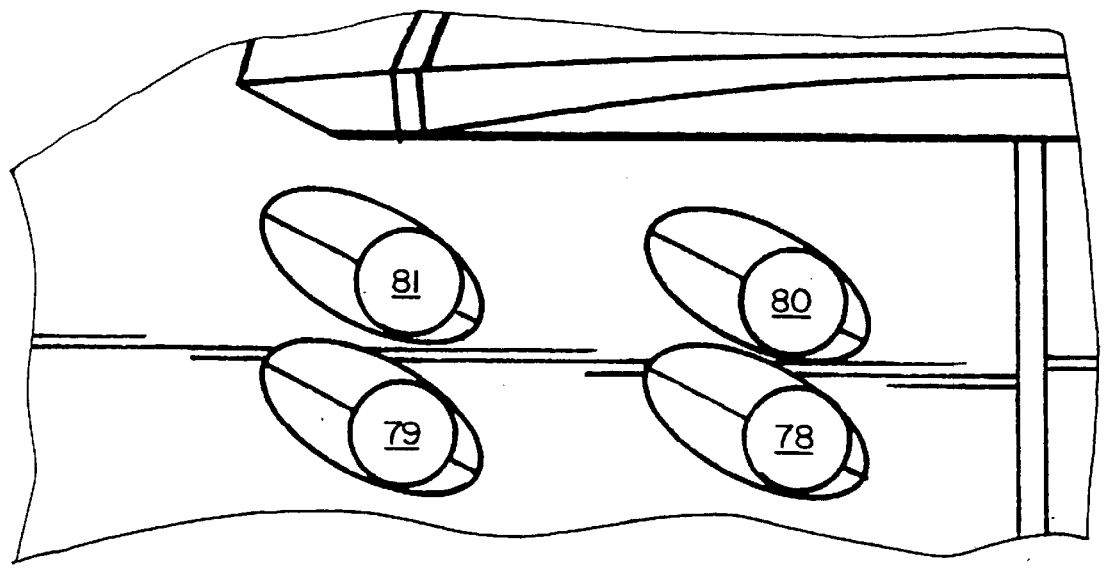

FIGS. 10–12 illustrate top plan views of an example embodiment of the alarm system 10 of the present invention. The enclosure 12 is preferably formed from a shock-proof plastic material although other materials may also work well. A preferred material for the enclosure 12 is a shatter-proof polycarbonate/ABS that is resistant to attempts to destroy it by throwing, kicking, or jumping on it. An illegal intruder may attempt to disable the apparatus of the present invention when the audio siren 54 sounds. With the enclosure 12 made of a material that resists impacts, the alarm may continue to sound and eventually cause the intruder to abandon efforts to disable it. The plastic may be formed into its desired shape by known processes such as blow molding or injection molding. The enclosure 12 of the present invention is also preferably formed of a unique ribbed construction which is explained in further detail below.

Figure 4:
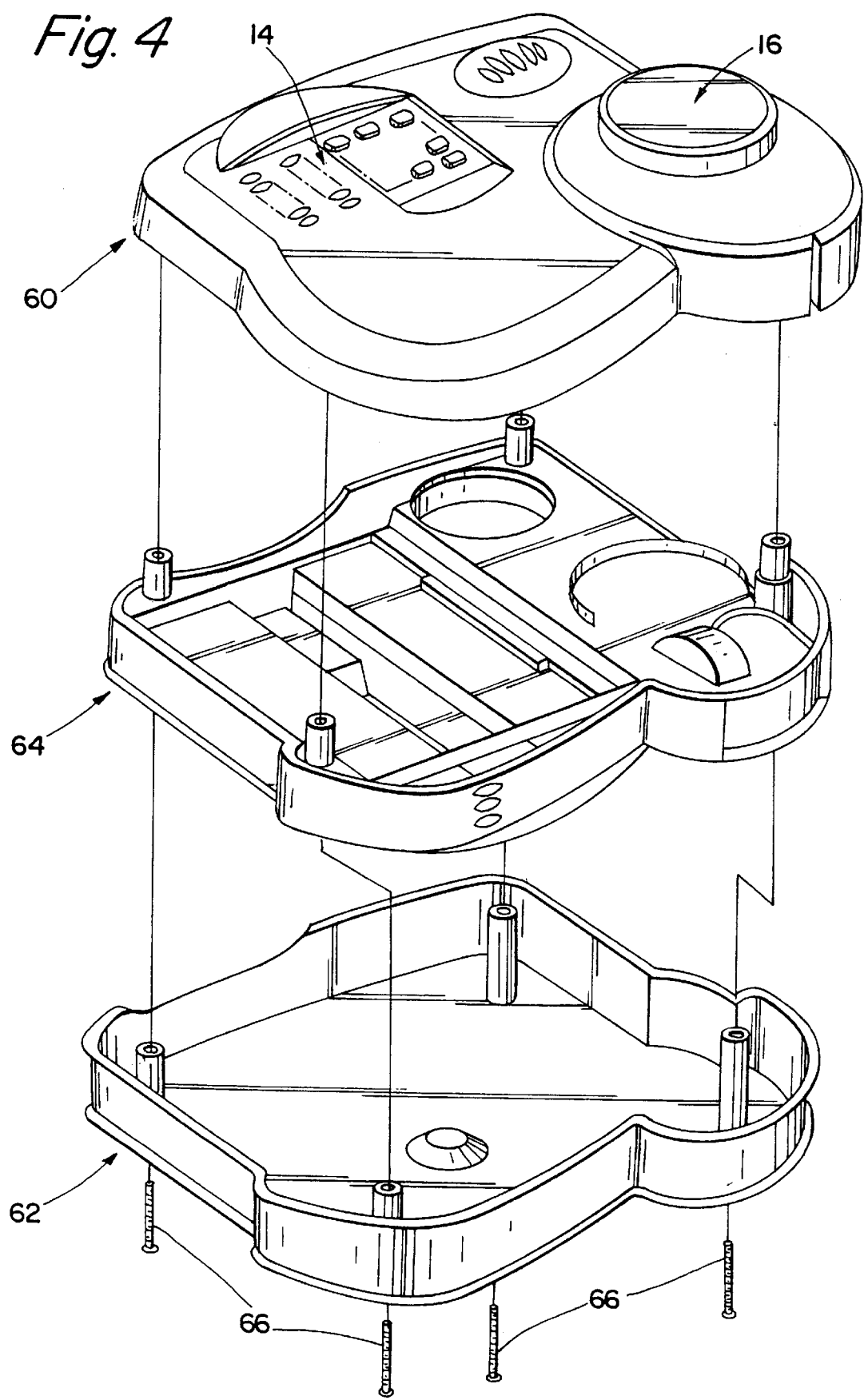
FIG. 4 is an exploded view of the shock-proof enclosure.

FIG. 4 is an exploded view of the shock-proof enclosure 12 of the present invention. The enclosure 12 is preferably comprised of a lid exterior 60 and a bottom exterior 62, and a body portion 64. The body 64 fits between the lid exterior 60 and the bottom exterior 62. The construction insulates the components of the alarm system 10 from shock. In the preferred embodiment, the top lid 60 is a single piece injection molded plastic construction. The same is true of the body 64 and the bottom 62. The microprocessor 20 and other electronic components are placed within the body 64 protecting the components from potential impact. The body 64 and lid 60 may be bolted to the bottom 62 by bolts 66.

The alarm system 10 of the present invention provides an efficient, inexpensive, and flexible portable alarm system which preferably contains wireless cellular technology that may be used to protect residences, temporary apartments, hotel rooms, campgrounds, cabins, boats, and virtually any other area which may need to be secured.

Although preferred embodiments of the present invention have been described above, the present invention is susceptible to several variations and implementations which take advantage of the technology described herein and which would fall under the scope of coverage granted hereby. The description contained herein is not to be considered as limiting the scope of the invention, but is offered as an example of how the present invention may be implemented.

What is claimed is:

1. A portable alarm system, wherein said portable alarm system is adapted to send signals over a control channel of a cellular telephone system to a remote switching office, comprising:

a portable enclosure;

a microprocessor installed within said enclosure;

a wireless receiver for receiving alarm signals from at least one zone within a structure being monitored, said wireless receiver installed within said enclosure and electrically connected to said microprocessor; and a transmitter for transmitting said signals which may be transmitted over said control channel to said remote switching office.

2. The portable alarm system of claim 1, further comprising:

an alarm in electrical communication with said microprocessor which is actuated by said microprocessor when said alarm signals are received by said wireless receiver.

3. The portable alarm system of claim 1, further comprising:

an LED for indicating a call has been transmitted over said control channel.

4. The portable alarm system of claim 1, further comprising:

a service light in electrical communication with said microprocessor for indicating when cellular service is/is not available.

5. The portable alarm system according to claim 1, further comprising:

a communications device secured within said enclosure and independent of any hard-wired telephone lines connected to said structure, said communication device adapted to initiate a primary function phone call to a location apart from said structure; and a data interface electrically connected to said communication device and said microprocessor for communicating a signal to said communication device from said microprocessor to cause said communication device to initiate a primary function phone call.

6. The portable alarm system of claim 5, wherein said communications device makes a primary function phone call when said control channel is busy.

7. A portable alarm system, wherein said portable alarm system is adapted to send signals over a control channel of a cellular telephone system to a remote switching office, comprising:

a portable enclosure;

a microprocessor installed within said enclosure;

a receiver for receiving alarm signals from at least one zone within a structure being monitored, said receiver installed within said enclosure and electrically connected to said microprocessor;

an interface for converting signals which indicate a zone has been violated to a radio signal for transmission;

a transmitter for transmitting said radio signal over a control channel of a cellular phone system to a central station for further processing.

8. A portable alarm system according to claim 7, further comprising:

a cellular telephone adapted to be carried within said portable enclosure and further adapted to enable the initiation, and completion of a cellular telephone call to a remote location and which enables two way audio communication through said call.

9. The portable alarm system of claim 8, wherein said alarm system makes a primary function phone call when said control channel is busy.

10. A portable alarm system, wherein said portable alarm system is adapted to send signals over a control channel of a cellular telephone system to a remote switching office, comprising:

an enclosure;

a microprocessor installed within said enclosure;

a receiver for receiving alarm signals from at least one zone within a structure being monitored, said receiver installed within said enclosure and electrically connected to said microprocessor; and a modem in electrical communication with said microprocessor for transmitting a radio signal over said control channel of said cellular phone system to a central station for further processing.

11. A portable alarm system according to claim 10, further comprising:
   a communications device secured within said enclosure and independent of any hard-wired telephone lines connected to said structure, said communication device adapted to initiate a primary function phone call for voice communication to a location apart from said structure; and
   a data interface electrically connected to said communication device and said microprocessor for communicating a signal to said communication device from said microprocessor to cause said communication device to initiate a primary function phone call for voice communication.

12. The portable alarm system of claim 11, wherein said communications device makes a primary function phone call for voice communication when said control channel is busy.

13. The portable alarm system of claim 11, wherein said enclosure is comprised of: a bottom, a lid, and a body portion, made from injection molded polycarbonate/ABS plastic, thereby providing shock resistance.

14. The portable alarm system of claim 11, wherein said communication device is a wireless cellular phone communication system.

15. The portable alarm system of claim 14, wherein said cellular phone communication system is adapted to be used as a conventional cellular phone independent of the alarm system functions.

16. The portable alarm system of claim 10, further comprising:
   a motion sensor for detecting intrusion into a protected area, said motion sensor electrically connected to said microprocessor and within said enclosure.

17. The portable alarm system of claim 10, further comprising:
   an LED board electrically connected to said microprocessor and within said enclosure for indicating the current status of said alarm system.

18. The portable alarm system of claim 10, further comprising:
   an audio siren electrically connected to said microprocessor and within said enclosure; and
   a strobe light electrically connected to said microprocessor and within said enclosure.

19. The portable alarm system of claim 10, further comprising:
   a back-up battery, electrically connected to said microprocessor, for providing back-up power to said microprocessor.

20. The portable alarm system of claim 10, further comprising a surveillance camera electrically connected to said microprocessor and secured within said enclosure.

21. The portable alarm system of claim 10, further comprising:
   a cellular handset adapted to reside at said portable enclosure so that cellular phone calls may be made through said alarm system.

22. The portable alarm system of claim 10, further comprising:
   an LED in electrical communication with said processor for indicating when a call is being transmitted to a remote monitoring center.

23. The portable alarm system of claim 10, further comprising:
   a service light in electrical communication with said microprocessor for indicating when cellular service is/is not available.

24. The portable alarm system of claim 10, further comprising:
   a low battery light indicator in electrical communication with said processor.

25. The portable alarm system of claim 10, further comprising:
   a transmitter for sending alarm signals to said receiver; and
   an LED in electrical communication with said processor that provides information on the status of said transmitter.

26. The portable alarm system of claim 10, further comprising
   an LED in electrical communication with said processor that emits light when said alarm system is in the instant arming mode.

* * * * *